3,004,890
NEW PREGNANE-18-ACID DERIVATIVES

Albert Wettstein, Karl Heusler, and Peter Wieland, Basel, Switzerland, assignors to Ciba Pharmaceutical Products Inc., Summit, N.J.
No Drawing. Filed June 29, 1959, Ser. No. 823,356
Claims priority, application Switzerland July 1, 1958
18 Claims. (Cl. 167—65)

This invention provides new pregnane-18-acid derivatives oxygenated in 16-position and a process for their manufacture.

It is already known that the extraordinarily strong sodium-retaining effect of the adrenal cortex hormone aldosterone is lost by small variations of the functional groups. Thus, for example, the (18→11)-lactone of $\Delta^4$-3:20-dioxo-11$\beta$:21-dihydroxy-pregnene-18-acid, easily obtainable by oxidation of aldosterone 21-monoacetate, and (18→11)-lactone of $\Delta^4$-3:20-dioxo-11$\beta$-hydroxy-pregnene-18-acid no longer exhibit sodium-retaining action. In a surprising manner, the introduction of a 16$\alpha$-hydroxyl group, especially into the last named compound, causes the occurrence of a distinct sodium-retaining effect, such as is typical for aldosterone itself. This observation is of considerable importance since the 16-hydroxylated compounds of the present invention are more easily available than aldosterone.

The compounds of the present invention can therefore be employed for the restoration of a disturbed sodium balance, for example in cases of adrenal insufficiency, instead of the natural hormone aldosterone.

The process for the manufacture of the new pregnane-18-carboxylic acid derivatives oxygenated in 16-position consists in that a compound of the formula

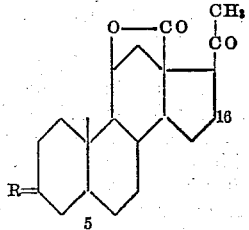

which may possess a double bond originating from the carbon atom 5 and in which R is a hydrogen atom together with a free or esterified hydroxyl group or a free or ketalized oxo group and which, if desired, contains in 16:17-position a further double bond, is oxidised in 16-position and, if desired, the newly introduced oxygen function converted into a free or esterified hydroxyl group.

If there is used as starting material a pregnane derivative saturated in 16-position the enzymatic oxidation is primarily suitable for the introduction of the 16$\alpha$-hydroxyl group; the starting material is aerobically incubated with living micro-organisms capable of introducing oxygen into the 16$\alpha$-position. It is also possible, however, to separate more or less the enzymes from the culture filtrate or the micro-organisms and then to work in the absence of living micro-organisms. The 16$\alpha$-hydroxylating micro-organisms, for example Streptomyces sp. A–7747, *Streptomyces roseochromogenus*, *Didymella vodakii* and *Pestalotia funera*, are cultured in a manner known per se, for example in stationary or in submerged, agitated cultures, which advantageously contain assimilable carbon, for example carbohydrates. The simplest practical process is set out as follows, although others are possible: The organisms are cultured in apparatus and under similar conditions as are known in the manufacture of antibiotics in the so-called deep tank process. After development of the cultures, the specified starting materials are introduced in fine dispersion or solution, for example in methanol, acetone or ethylene glycol and incubation is continued. Finally the mycelium is separated off and the filtrate and/or the mycelium mass extracted, and from the extract the reaction products isolated in a manner known per se, for example by partition processes, adsorption, chromatography, crystallization, conversion into functional derivatives, such as Girard compounds, and the like.

It is however, also possible first to prepare from 16:17-unsaturated compounds by oxidation with a peroxide compound, for example an organic per-acid such as perbenzoic acid or mono-perphthalic acid or with hydrogen peroxide in alkaline solution, a 16:17$\alpha$-epoxide and subsequently to split this up reductively to the 16$\alpha$-hydroxy compound. This splitting up can be carried out by two methods. One consists in that the 16$\alpha$:17$\alpha$-epoxide is treated with chromus chloride or acetate, whereby with reductive opening of the epoxide ring the 16$\alpha$-hydroxyl compound is obtained directly. By a further method, the 16$\alpha$:17$\alpha$-epoxide is reacted with an aryl hydrazine, advantageously in the presence of an acid catalyst, for example p-toluene sulfonic acid, the resulting $\Delta^{17(20)}$-16$\alpha$-hydroxy-20-arylazo-pregnene reduced, for example with zinc and glacial acetic acid in pyridine solution, to the 16$\alpha$-hydroxy-20-arylhydrazone and then the 20-oxo group liberated by hydrolysis, for example with pyroracemic acid and/or p-hydroxy-benzaldehyde.

Then, if desired, a double bond originating from the carbon atom 5 can be saturated, for example by means of hydrogen in the presence of a noble metal catalyst, for example palladium on a carrier substance such as animal charcoal, calcium carbonate, barium sulfate or the like. In resulting 3-ketones this group can be reduced to the 3-hydroxyl group, for example by means of complex metal hydrides capable of leaving a lactone group unattacked, for example with sodium-boron hydride. Ketal groups present, for example an ethylene ketal in 3-position, can be split up to the ketone under the action of acids, for example dilute acetic acid in the hot. Likewise a 16$\alpha$- and/or 3-hydroxyl group can be esterified in known manner. For this purpose reactive derivatives of saturated or unsaturated aliphatic or cycloaliphatic, aromatic, or heterocyclic carboxylic acids are suitable, preferably of lower aliphatic, monocyclic cycloaliphatic, aromatic or heterocyclic carboxylic acids, lower monocyclic araliphatic or cycloaliphatic carboxylic acids, such as, for example, those of formic acid, acetic acid, propionic acid, the butyric acids, valeric acids, such as n-valeric acid or trimethylacetic acid, the caproic acids such as $\beta$-trimethyl-propionic acid, the enanthic, caprylic, pelargonic, capric or undecylic acids, for example undecylenic acid, the lauric, myristic, palmitic or stearic acids, for example oleic, cyclopentyl-, cyclohexyl- or phenyl-acetic acids or propionic acids, benzoic acid, phenoxy-alkanoic acids, such as phenoxy-acetic acid, p-chlorophenoxy-acetic acid, 2:4-dichlorophenoxyacetic acid, 4-tertiary butylphenoxy-acetic acid, 3-phenoxypropionic acid, 4-phenoxy-butyric acid, furan-2-carboxylic acid, 5-tertiary butyl-furan-2-carboxylic acid, 5-bromofuran-2-carboxylic acid, the nicotinic acids, or also of the dicarboxylic acids, such as oxalic, succinic or glutaric acids, substituted carboxylic acids, such as $\beta$-keto-carboxylic acids, for example the acetoacetic, propionylacetic, butyrylacetic or caproylacetic acid, of amino acids and so on.

The products of the process of this invention are compounds of the formula

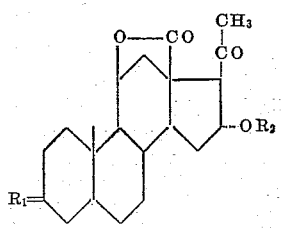

which can contain a double bond originating from carbon atom 5 and in which $R_1$ indicates a free or ketalised oxo group or a hydrogen atom together with a free or esterified hydroxyl group and $R_2$ indicates a hydrogen atom or an acyl group. The starting materials are known.

The new compounds can be used as medicaments, for example in the form of pharmaceutical preparations which contain the active substance in admixture with a pharmaceutical organic or inorganic, solid or liquid carrier suitable for enteral or parenteral administration. As carriers such substances come into consideration as do not react with the new compounds, such as for instance water, gelatine, lactose, starch, magnesium stearate, talc, vegetable oils, benzylalcohols, gums, polyalkylene glycols, cholesterol or other known carriers. The pharmaceutical preparations can be in the form, for instance, of tablets or dragees or in liquid form as solutions, suspension or emulsions. They may be sterilized and or contain auxiliary substances, such as preserving, stabilizing, wetting or emulsifying agents, salts for the modification of osmotic pressure or buffers. They may also contan other therapeutically useful substances. The preparations are obtained in the customary way. The content of active substance in these preparations, such as of an ampoule, is preferably 0.1–200 mg. or 0.03–60%.

The following examples illustrate the invention:

*Example 1*

To a solution of 1 gram of the (18→11)-lactone of $d:l$ - $\Delta^5$ - 3-ethylenedioxy - 11$\beta$ - hydroxy - 16$\alpha$:17$\alpha$-oxido-20-oxo-pregnene-18-acid in 100 cc. of acetone is added with stirring in a stream of nitrogen a solution of 7.2 grams of sodium acetate in 25 cc. of water and 5 cc. of glacial acetic acid and then a suspension of about 13 millimols of chromous acetate in 50 cc. of 80% acetone. After 20 hours stirring in a stream of nitrogen at room temperature, the whole is diluted with 1 liter of saturated common salt solution and 200 cc. of water and extracted once with 400 cc. and twice with 200 cc. of benzene. The organic solutions are extracted with 200 cc. of saturated common salt solution, 200 cc. of 5% sodium bicarbonate solution, 200 cc. of saturated common salt solution and 200 cc. of water. After drying and evaporation under vacuum at 40° bath temperature, the residue is dissolved in 6 cc. of methylene chloride and 30 cc. of benzene and chromatographed on 40 grams of silica gel. With benzene-ethyl acetate (9:1) and (4:1)-mixtures is eluted the (18→11)-lactone of $d:l$ - $\Delta^{5:16}$ - 3 - ethylenedioxy-11$\beta$-hydroxy-20-oxo-pregnadiene-18-acid (380 mg.), while from the benzene-ethyl acetate (1:1)- and ethyl acetate eluates, after recrystallization from methylene chloride-ether 400 mg. of the (18→11)-lactone of $d:l$-$\Delta^5$-3-ethylenedioxy-11$\beta$:16$\alpha$-dihydroxy-20-oxo-pregnene-18-acid are obtained. It melts at 226–228.5° C. (with decomposition). The infra-red spectrum (solvent:methylene chloride) exhibits among others the following bands: 2.78$\mu$ (hydroxyl); 5.65$\mu$ ($\gamma$-lactone); 5.86$\mu$ (20-CO) and 9.08$\mu$ (ketal).

The 16:17$\alpha$-epoxide used as starting material can be produced as follows:

5.0 grams of the (18→11)-lactone of $d:l$-$\Delta^{5:16}$-3-ethylenedioxy-11$\beta$-hydroxy-20-oxo-pregnadiene-18-acid are dissolved in a mixture of 200 cc. of benzene and 600 cc. of methanol. To the solution, cooled to 0° C., are added 10 cc. of 4 N-sodium hydroxide solution and 20 cc. of 30% aqueous hydrogen peroxide and the reaction mixture is allowed to stand for 24 hours at 0° C. It is then poured into 2 liters of water and the whole extracted three times, with 1.5 liters of chloroform each time. The chloroform extracts are washed with water, combined, dried and evaporated. The crystallized residue (5.36 grams) is recrystallized from a mixture of methylene chloride and methanol. 5.03 grams are obtained of the (18→11)-lactone of $d:l$-$\Delta^5$-3-ethylenedioxy-11$\beta$-hydroxy-16$\alpha$:17$\alpha$-oxido-20-oxo-pregnene-18-acid of M.P. 272.5–275° C. The compound shows in the infrared spectrum (methylene chloride solution) among others bands at: 5.65$\mu$ ($\gamma$-lactone); 5.85$\mu$ (20-CO); 9.10$\mu$ (3-ketal).

*Example 2*

1.2 grams of the (18→11)-lactone of $d:l$-$\Delta^4$-3:20-dioxo-11$\beta$-hydroxy-16$\alpha$:17$\alpha$-oxido-pregnene-18 acid are dissolved in 100 cc. of acetone and with stirring in a stream of nitrogen treated first with a solution of 7.2 grams of sodium acetate in 25 cc. of water and 5 cc. of glacial acetic acid and then with a suspension of about 15 millimols of chromous acetate in 50 cc. of 80% acetone. After 6 hours stirring at room temperature, addition of 400 cc. of benzene, 1 liter of saturated common salt solution and 200 cc. of water and thorough shaking, the aqueous phase is extracted twice further with 200 cc. of benzene. The residue from the organic solutions after washing with 200 cc. of saturated common salt solution, 200 cc. of 5% sodium bicarbonate solution, 200 cc. of saturated common salt solution and 200 cc. of water, drying and evaporation under vacuum at a bath temperature of 40° C., is dissolved in a chloroform-benzene mixture and chromatographed on 60 grams of silica gel (containing 15% of water). In the fractions eluted with ethyl acetate is found the (18→11)-lactone of $d:l$-$\Delta^4$-3:20-dioxo-11$\beta$:16$\alpha$-dihydroxy-pregnene-18-acid, which after recrystallization from a chloroform-methanol mixture melts at 261.5–265° C. (with decomposition). The following are characteristic bands in the infra-red spectrum of the product when taken up in pure liquid paraffin paste: 2.98$\mu$ (hydroxyl); 5.66$\mu$ ($\gamma$-lactone); 5.85$\mu$ (20-CO) and 6.04$\mu$+6.19$\mu$ ($\Delta^4$-3-ketone).

The same compound can also be prepared in the following manner by ketal splitting of the (18→11)-lactone of the $d:l$-$\Delta^5$-3-ethylenedioxy-11$\beta$:16$\alpha$-dihydroxy-20-oxo-pregnene-18-acid described in Example 1: 400 mg. of this ketal are heated with 20 cc. of 90% acetic acid in a stream of nitrogen for 10 minutes to 100° C., whereupon the whole is evaporated under vacuum, benzene added, evaporation repeated and this operation carried out repeatedly until the odour of acetic acid has disappeared. The residue, which according to its infra-red spectrum consists of a mixture of $\Delta^4$- and $\Delta^5$-3-ketone, is converted as follows into pure $\Delta^4$-3-ketone: It is dissolved in a mixture of 20 cc. of chloroform and 10 cc. of alcohol and chromatographed on a mixture of 20 grams of Carboraffin and 40 grams of Celite. By recrystallization of the acetone and chloroform eluates from a chloroform-alcohol-ether mixture 275 mg. are obtained of the pure (18→11)-lactone of $d:l$-$\Delta^4$-3:20-dioxo-11$\beta$:16$\alpha$-dihydroxy-pregnene-18-acid, which is identical with the preparation obtained above.

50 mg. of the (18→11)-lactone of $d:l$-$\Delta^4$-3:20-dioxo-11$\beta$:16$\alpha$-dihydroxy-pregnene-18-acid, 50 mg. of a 10% palladium-calcium carbonate catalyst and 10 cc. of absolute alcohol are stirred in a hydrogen atmosphere. After the absorption of one mol equivalent of hydrogen the hydrogenation comes to a standstill, whereupon the catalyst is filtered off, washed with alcohol and methylene chloride and evaporated under vacuum. After recrystallization from a methylene chloride-alcohol-ether mixture there is obtained the (18→11)-lactone of $d:l$-3:20-dioxo-11$\beta$:16$\alpha$-dihydroxy-allopregnane-18-acid of M.P. 232–234° C. (with decomposition). The infra-red spectrum in purse liquid paraffin exhibits among others the following characteristic bands: 2.90μ (hydroxyl); 5.64μ (γ-lactone) and 5.85μ (3-ketone and 20-ketone).

To a solution of 89 mg. of the (18→11)-lactone of d:l - 3:20 - dioxo - 11β:16α - dihydroxy - allopregnane-18-acid in 12 cc. of tetrahydrofuran there is added with ice water cooling and stirring a solution of 3.8 mg. of sodium-boron hydride in 0.065 cc. of water and the whole is stirred for 8 hours at room temperature. After a further 14 hours the whole is treated with 0.5 cc. of 10% acetic acid and with 50 cc. of semi-saturated common salt solution and extracted three times with 100 cc. of methylene chloride. Then the methylene chloride extracts are extracted by shaking twice with 50 cc. of semi-saturated common salt solution, dried and evaporated under vacuum. By recrystallization of the crystalline residue from a chloroform-alcohol-ether mixture there is obtained the (18→11)-lactone of d:l-3β:11β:16α-trihydroxy-20-oxo-allopregnane-18-acid of M.P. 248.5–249.5° C. (with decomposition). The infra-red spectrum (pure liquid paraffin paste) shows among others the following characteristic bands: 3.03μ (hydroxyl); 5.66μ (γ-lactone) and 5.84μ (20-ketone).

The (18→11)-lactone of d:l-Δ⁴-3:20-dioxo-11β-hydroxy-16α:17α-oxido-pregnene-18-acid used in this example as starting material can be obtained as follows from the (18→11)-lactone of d:l-Δ⁵-3-ethylene-dioxy-11β-hydroxy-16α:17α-oxido-20-oxo-pregnene-18-acid described in Example 1: 800 mg. of this ketal are dissolved in 40 cc. of glacial acetic acid and heated to 100° C. The whole is then treated with 40 cc. of water, then kept for 25 minutes at 100° C. followed by evaporation in a water pump vacuum to 20–30 cc. Dilution with water is then carried out, followed by extraction several times with methylene chloride and the extracts are washed with sodium bicarbonate solution and water. From the dried and evaporated methylene chloride solutions, 700 mg. of crystalline residue are obtained. After recrystallization from methylene chloride-ether or methylene chloride-methanol, the (18→11)-lactone of d:l-Δ⁴-3:20-dioxo-11β-hydroxy-16α:17α-oxido-pregnene-18-acid melts at 262–266° C. The compound shows in the infrared spectrum (methylene chloride solution) among others the following bands: 5.64μ (γ-lactone); 5.86μ (20-CO); 5.98μ (3-CO) and 6.18μ (Δ⁴).

*Example 3*

Four conical flasks each of 500 cc. capacity are charged in each case with 100 cc. of a nutrient solution containing in 1 liter of tap water the following additions: 10 grams of crude glucose, 5 grams of peptone, 3 grams of meat extract (Oxo Lab Lemco), 5 grams of sodium chloride and 10 grams of calcium carbonate. The flasks are sterilized in an autoclave and then inoculated with Streptomyces sp. A–7747. The cultures are mechanically agitated at 26° C. and within 26 hours they are well developed. There is then added to each culture under sterile conditions a suspension of 30 mg. of the (18→11)-lactone of Δ⁴-3:20-dioxo-11β-hydroxy-pregnene-18-acid in 1 cc. of acetone, whereupon the cultures are agitated for a further 48 hours at 26° C. The mycelium is separated off and the combined culture filtrate extracted three times with 100 cc. of ethyl acetate. The extracts are washed with a little water, combined, dried with sodium sulfate and evaporated under vacuum. Paper chromatographic examination of the resulting residue (150 mg.) shows by comparison with the compound described in Example 2 that in the crude product, together with starting material and a few secondary products, the chief constituent is the (18→11)-lactone of Δ⁴-3:20-dioxo-11β:16α-dihydroxy-pregnene-18-acid. This can be isolated in pure form by preparative paper chromatography.

In a completely analogous manner, instead of the cultures of Streptomyces sp. A–7747, those of *Streptomyces roseochromogenus, Pestalotia funera* or *Didymella vodakii* can be used.

What is claimed is:
1. A compound selected from the group consisting of a compound of the formula

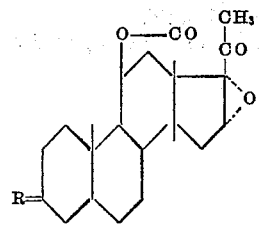

and a derivative thereof unsaturated in one of the positions 4:5 and 5:6, in which R stands for an oxo group, said oxo group being ethylenedioxy-ketalized when unsaturation is present in the 5:6-position.

2. The (18→11)-lactone of Δ⁵-3-ethylenedioxy-11β-hydroxy-16:17α-oxido-20-oxo-pregnene-18-acid.

3. The (18→11)-lactone of Δ⁴-3:20-dioxo-11β-hydroxy-16α:17α-oxido-pregnene-18-acid.

4. A compound selected from the group consisting of a compound of the formula

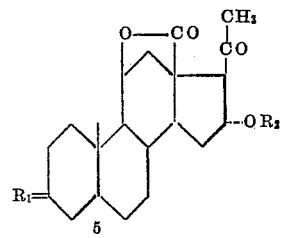

and a derivative thereof unsaturated in one of the positions 4:5 and 5:6 in which R₁ stands for a member selected from the group consisting of an oxo group,

and

said oxo group being ethylenedioxy-ketalized when unsaturation is present in the 5:6-position and R₂ for a member selected from the group consisting of a hydrogen atom and an acyl group.

5. A pharmaceutical composition comprising a compound of claim 4 containing the active ingredient in an amount ranging from 0.03–60% together with a suitable pharmaceutical carrier.

6. A pharmaceutical composition as claimed in claim 5, containing the active ingredient in an amount ranging from 0.03–60% together with a suitable pharmaceutical carrier in the form of a tablet.

7. A pharmaceutical composition as claimed in claim 5 containing the active ingredient in an amount ranging from 0.03–60% together with a suitable pharmaceutical carrier in the form of an oil ampoule.

8. A pharmaceutical composition as claimed in claim 5 containing the active ingredient in an amount ranging from 0.03–60% together with a suitable pharmaceutical carrier in the form of an ampoule containing an aqueous solution.

9. The (18→11)-lactone of Δ⁵-3-ethylenedioxy-11β:16α-dihydroxy-20-oxo-pregnene-18-acid.

10. A 16-ester of the compound claimed in claim 9.

11. The (18→11)-lactone of Δ⁴-3:20-dioxo-11β:16α-dihydroxy-pregnene-18-acid.

12. A 16-ester of the compound claimed in claim 11.

13. The (18→11)-lactone of 3:20-dioxo-11β:16α-dihydroxy-allopregnane-18-acid.

14. A 16-ester of the compound claimed in claim 13.

15. The (18→11)-lactone of 3β:11β:16α-trihydroxy-20-oxo-allopregnane-18-acid.

16. A 3:16-diester of the compound claimed in claim 15.

17. A 3-ester of the compound claimed in claim 15.

18. A 16-ester of the compound claimed in claim 15.

References Cited in the file of this patent
UNITED STATES PATENTS

| | | |
|---|---|---|
| 2,841,531 | Wettstein et al. | July 1, 1958 |
| 2,844,513 | Wettstein et al. | July 22, 1958 |

UNITED STATES PATENT OFFICE
CERTIFICATION OF CORRECTION

Patent No. 3,004,890            October 17, 1961

Albert Wettstein et al.

It is hereby certified that error appears in the above numbered patent requiring correction and that the said Letters Patent should read as corrected below.

Column 4, line 75, for "purse" read -- pure --; column 6, lines 5 to 14, the formula should appear as shown below instead of as in the patent:

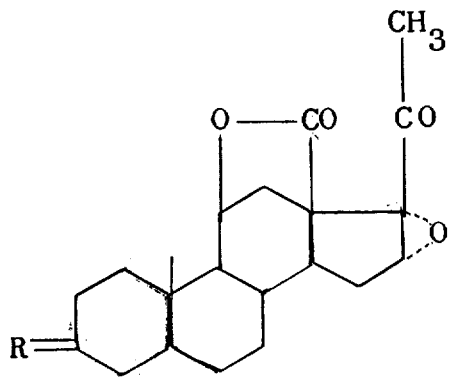

Signed and sealed this 3rd day of July 1962.

(SEAL)
Attest:

ERNEST W. SWIDER

Attesting Officer

DAVID L. LADD

Commissioner of Patents